(12) United States Patent
Lantz et al.

(10) Patent No.: US 9,030,311 B2
(45) Date of Patent: *May 12, 2015

(54) PALLET TRUCK WITH LIFT INDICATOR ASSEMBLY AND ASSOCIATED METHODS

(71) Applicant: CHEP Technology Pty Limited, Sydney, NSW (AU)

(72) Inventors: Daniel J. Lantz, Orlando, FL (US); Jason R. Ertel, Gahanna, OH (US); Christopher Lundquist, Columbus, OH (US)

(73) Assignee: CHEP Technology Pty Limited, Sydney (AU)

(*) Notice: Subject to any disclaimer, the term of this patent is extended or adjusted under 35 U.S.C. 154(b) by 0 days.

This patent is subject to a terminal disclaimer.

(21) Appl. No.: 14/132,621

(22) Filed: Dec. 18, 2013

(65) Prior Publication Data

US 2014/0132406 A1 May 15, 2014

Related U.S. Application Data

(62) Division of application No. 13/469,743, filed on May 11, 2012, now Pat. No. 8,632,082.

(60) Provisional application No. 61/485,946, filed on May 13, 2011.

(51) Int. Cl.
  *B62D 21/14* (2006.01)
  *B66F 9/075* (2006.01)
  *B66F 9/20* (2006.01)
  *B62B 3/06* (2006.01)
  *B62B 5/00* (2006.01)

(52) U.S. Cl.
  CPC .................. *B66F 9/0755* (2013.01); *B66F 9/20* (2013.01); *B62B 5/0006* (2013.01); *B62B 5/0069* (2013.01); *B62B 3/0612* (2013.01); *B62B 2203/24* (2013.01)

(58) Field of Classification Search
  CPC ................................ B66F 9/0755; B66F 9/20
  USPC ........ 340/673, 679, 685, 686.1, 686.2, 686.6, 340/689; 280/43.11, 43.12, 43.15, 43.17, 280/43.2; 187/222, 223, 282; 414/641, 642
  See application file for complete search history.

(56) References Cited

U.S. PATENT DOCUMENTS

| | | | |
|---|---|---|---|
| 2,618,490 A | 11/1952 | Frischmann | |
| 3,883,021 A | 5/1975 | Wilhelm | |
| 4,274,794 A | 6/1981 | Olson | |
| 4,747,610 A | * 5/1988 | Yingling et al. ........... | 280/43.12 |
| 4,869,635 A | 9/1989 | Krahn | |
| 4,923,361 A | 5/1990 | Adolfsson | |

(Continued)

*Primary Examiner* — Van Trieu
(74) *Attorney, Agent, or Firm* — Allen Dyer Doppelt Milbrath & Gilchrist, P.A.

(57) ABSTRACT

A lift indicator assembly for a pallet truck includes a lift sensor assembly, and a lift status display for determining a lift condition of a load wheel of the pallet truck. The lift sensor assembly is to be carried by a fork of the pallet truck and includes a housing section, and a primary sensor assembly. The primary sensor assembly includes a first primary arm coupled to the housing section, and a first primary contact switch carried by the housing section and adjacent the first primary arm. The first primary contact switch has an engaged position and a disengaged position based on position of the first primary arm. The lift status display determines the lift condition of the load wheel based on position of the first primary contact switch.

9 Claims, 10 Drawing Sheets

(56) References Cited

U.S. PATENT DOCUMENTS

| | | | |
|---|---|---|---|
| 5,586,620 A | * | 12/1996 | Dammeyer et al. ........... 187/227 |
| 5,738,187 A | * | 4/1998 | Dammeyer et al. ........... 187/222 |
| 5,749,696 A | | 5/1998 | Johnson |
| 5,897,286 A | | 4/1999 | Whitaker |
| 6,138,795 A | | 10/2000 | Kamiya |
| RE37,215 E | * | 6/2001 | Dammeyer et al. ........... 187/222 |
| 6,269,913 B1 | | 8/2001 | Kollmannsberger et al. |
| 6,296,081 B1 | | 10/2001 | Nagai et al. |
| 7,287,625 B1 | | 10/2007 | Harris |
| 7,296,806 B2 | * | 11/2007 | Borrmann ................. 280/43.12 |
| 8,078,368 B2 | | 12/2011 | Hall |
| 8,157,500 B1 | | 4/2012 | Husmann |

\* cited by examiner

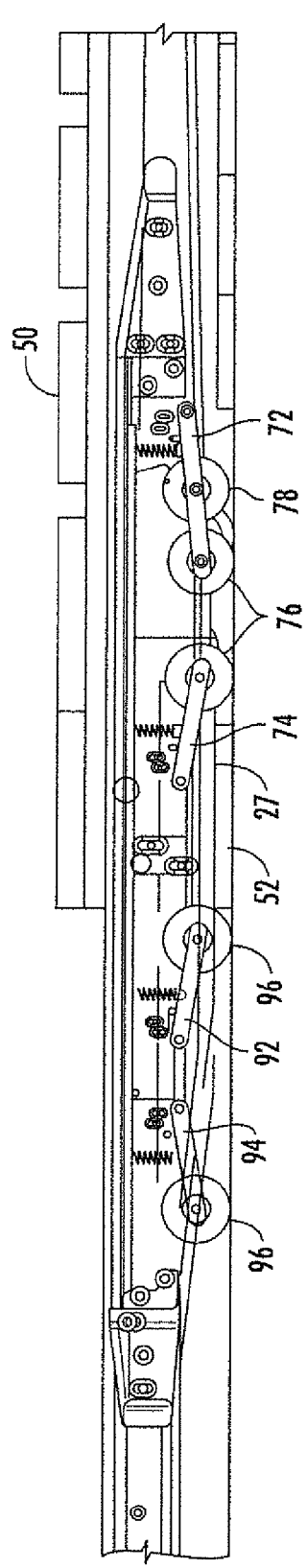
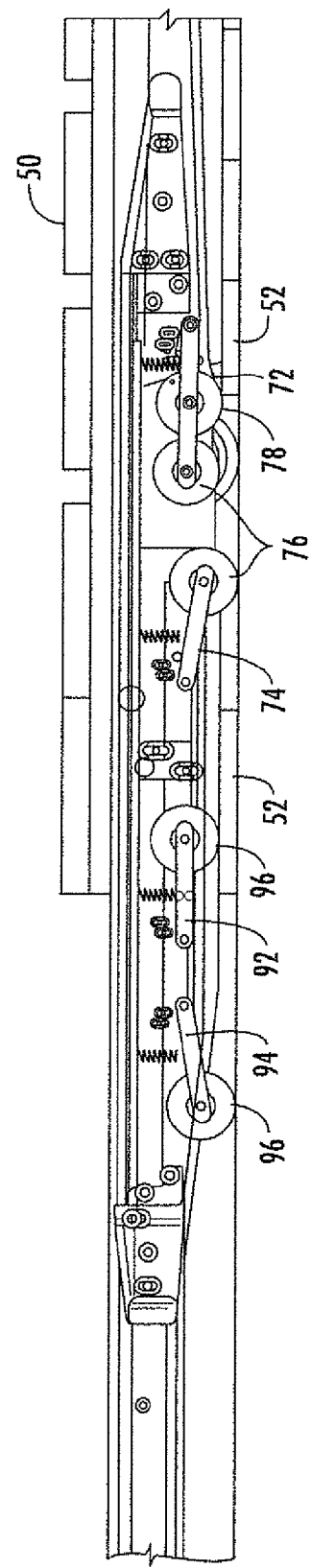

PALLET TRUCK WITH LIFT INDICATOR ASSEMBLY AND ASSOCIATED METHODS

RELATED APPLICATIONS

This application claims the benefit of U.S. Provisional Application Ser. No. 61/485,946 filed May 13, 2011 and U.S. Pat. No. 8,632,082, the entire contents of which are incorporated herein by reference.

FIELD OF THE INVENTION

The present invention relates to the field of pallet trucks, and more particularly, to a pallet truck with a lift indicator assembly to prevent damaging bottom deck boards of a pallet when lifting the pallet.

BACKGROUND OF THE INVENTION

Pallet trucks are commonly used to load and unload pallets from a truck. A typical pallet includes a bottom deck, a top deck and support blocks. The support blocks are coupled between the bottom and top decks and define an opening therebetween for receiving lifting members of material handling equipment, such as forks from a pallet truck.

A typical pallet truck includes a cab, a vertical load plate on a front end of the cab, and a pair of forks or tines extending outwards from a lower end of the vertical load plate in a substantially horizontal direction. A load wheel is in each fork. The load wheel may also be referred to as a lift wheel. Each load wheel is coupled to a respective load wheel linkage that is pivotally coupled to the fork. The maximum lift of the forks may vary depending on the pallet truck, but a typical lift height is about 6 inches.

When an operator of the pallet truck extends the forks into an opening of a pallet, the operator cannot readily observe the position of the load wheels because of the boards in the top deck of the pallet and any load carried on the top deck. If the load wheels come to rest on a bottom deck board of the pallet, then downward movement of the load wheels to lift the forks results in separation of the bottom deck board from the pallet.

One approach to this problem is to mount light sensors on at least one of the forks, as disclosed in U.S. Pat. No. 4,747,610. The light sensors detect the positions of the load wheels with respect to the bottom deck boards of the pallet. A disadvantage of light sensors is that they may fail to properly operate due to blockage of the light beams by dirt and debris.

SUMMARY OF THE INVENTION

In view of the foregoing background, it is therefore an object of the present invention to provide a lift indicator assembly that reliably prevents bottom deck boards of a pallet from being damaged when lifted by a pallet truck.

This and other objects, advantages and features in accordance with the present invention are provided by a pallet truck comprising a cab, a vertical load plate on a front end of the cab, and at least one fork extending outwards from a lower end of the vertical load plate in a substantially horizontal direction for insertion into an opening in a pallet. The pallet includes a bottom deck, a top deck and support blocks coupled between the bottom and top decks to define the opening. A load wheel may be coupled to the at least one fork and may be configured for lifting the at least one fork and the vertical load plate.

A lift sensor assembly may be carried by the at least one fork and adjacent the load wheel, and may comprise a housing section, and a primary sensor assembly. The primary sensor assembly may comprise a first primary arm coupled to the housing section, and a first primary contact switch carried by the housing section and adjacent the first primary arm. The first primary contact switch has an engaged position and a disengaged position based on position of the first primary arm. A lift status display may be configured for determining a lift condition of the load wheel based on position of the first primary contact switch.

Position of the first primary contact switch is advantageously used to determine the lift condition of the load wheel. If the first primary contact switch is in an engaged position when the fork is inserted into the pallet opening, then the pallet would be damaged if the load wheel were to lift the pallet. However, if the first primary contact switch is in a disengaged position when the fork is inserted into the pallet opening, then the pallet would not be damaged if the load wheel were to lift the pallet. The lift status display provides this information to an operator of the pallet truck.

The primary sensor assembly may further comprise a second primary arm coupled to the housing section, and a second primary contact switch carried by the housing section and adjacent the second primary arm. The second primary contact switch also has an engaged position and a disengaged position based on position of the second primary arm. The lift status display may be further configured for determining the lift condition of the load wheel based on position of the second primary contact switch in combination with the position of the first primary contact switch.

The first primary arm may be coupled to the housing section in front of the load wheel, and the second primary arm may be coupled to the housing section behind the load wheel. The first and second primary arms may be pivotally coupled to the housing section.

The bottom deck of the pallet comprises a plurality of spaced apart bottom deck boards. The at least one fork may have a wedge shape with an outermost tip extending in height above a thickness of the plurality of bottom deck boards. The primary sensor assembly may be adjacent the outmost tip so that when a lowermost surface of the at least one fork is contacting an upper surface of at least one of the bottom deck boards, the first primary arm moves downwards without contacting a bottom deck board so that the first primary contact switch is in the disengaged position.

The lift sensor assembly may further comprise an auxiliary sensor assembly comprising at least one auxiliary arm coupled to the housing section, and at least one auxiliary contact switch carried by the housing section. The at least one auxiliary contact switch also has an engaged position and a disengaged position based on position of the at least one auxiliary arm. The lift status display may be further configured for determining the lift condition of the load wheel based on position of the at least one auxiliary contact switch in combination with the position of the first primary contact switch. The auxiliary sensor assembly is advantageously used to indicate a lift condition when the at least one fork is on the ground without engaging a pallet, as well as preventing false positives when engaging a pallet. False positives may occur if the spacing of the bottom deck boards in the pallet is such that the primary and auxiliary contact switches are simultaneously engaged, thereby indicating a lift condition even though the load wheel may be on one of the bottom deck boards. The spacing of the primary and auxiliary arms is selected with respect to the spacing of the bottom deck boards in the pallet to minimize the occurrence of false positives.

The lift status display may comprise at least one light for visually displaying the lift condition of the load wheel. The lift status display may comprise a controller for activating the at least one light based on the position of the first primary contact switch. An interface between the lift status display and the first primary contact switch may be a wired or wireless interface.

The lift sensor assembly may further comprise a biasing device for biasing the first primary arm away from the first primary contact switch. In addition, the lift indicator assembly may further comprise a load wheel inhibitor coupled to the lift status display to prevent the load wheel from lifting the at least one fork and the vertical load plate based on the determined lift condition of the load wheel.

Another aspect is directed to a method for providing a lift indicator assembly for a pallet truck comprising at least one fork extending in a substantially horizontal direction for insertion into an opening in a pallet, and a load wheel coupled to the at least one fork and configured for lifting the at least one fork. The method may comprise providing a lift sensor assembly as described above to be carried by the at least one fork. The method may further comprise providing a lift status display for determining a lift condition of the load wheel based on position of the first primary contact switch.

BRIEF DESCRIPTION OF THE DRAWINGS

FIG. 9 is a cut-away side view of a fork inserted into a pallet with a lift sensor assembly attached thereto indicating a lift condition in accordance with the present invention.

FIG. 10 is a cut-away side view of a fork inserted into a pallet with a lift sensor assembly attached thereto indicating a no lift condition in accordance with the present invention.

DETAILED DESCRIPTION OF THE PREFERRED EMBODIMENTS

Figure 1:
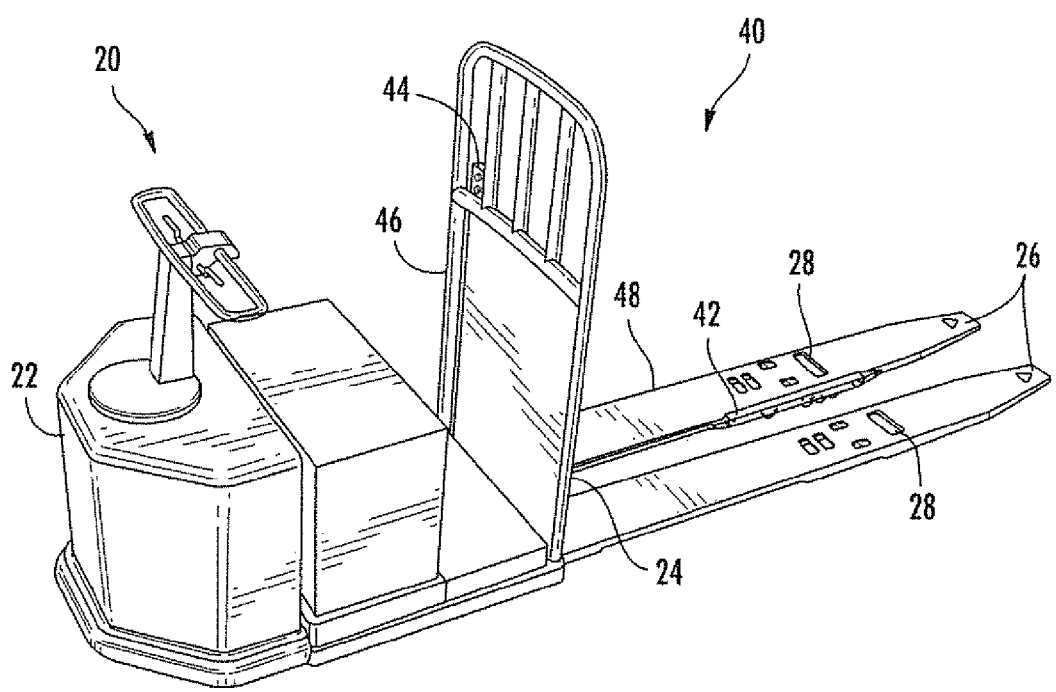
FIG. 1 is a side perspective view of a pallet truck with a lift indicator assembly in accordance with the present invention.

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Referring initially to FIGS. 1-5, a pallet truck 20 is modified to include a lift indicator assembly 40. The lift indicator assembly 40 includes a lift sensor assembly 42, a lift status display 44, and a cable 46 coupled therebetween. At least a portion of the cable 46 is protected by a cable cover 48. The pallet truck 20 includes a cab 22, a vertical load plate 24 on a front end of the cab, and a pair of forks or tines 26 extending outwards from a lower end of the vertical load plate in a substantially horizontal direction. A load or lift wheel 28 is in each fork 26. Each load wheel 28 is coupled to a respective load wheel linkage 30 that is pivotally coupled to the fork 26.

An operator drives a wheel positioned under the cab 22, and operates a hydraulic pump to raise and lower the forks 26. The hydraulic pump is coupled to a hydraulic cylinder that is coupled between the vertical load plate 24 and tie rods that extend through the forks 26 to the load wheel linkages 30.

To raise the forks 26, the hydraulic cylinder is actuated to move the vertical load plate 24 upwardly and to simultaneously pivot or move the load wheel linkages 30 downwardly to lower the load wheels 28, which in turn raise and support the forward ends of the forks 26 above the ground. The maximum lift of the forks 26 vary depending on the pallet truck, but a typical lift height is about 6 inches. To lower the forks 26 fluid in the hydraulic cylinder may be drained into a reservoir, so that the load wheels 28 are retracted and the forks are lowered by gravity. When the forks 26 are lowered, the load wheels 28 continue to support the forks on the ground.

The illustrated lift status display 44 is carried by the cab 22, and the lift sensor assembly 42 is attached to an inside sidewall of one of the forks 16 adjacent the load wheel 28. Alternatively, the lift sensor assembly 42 could be attached to an outside sidewall of one of the forks 26. In both of these embodiments, the lift sensor assembly 42 is mounted external one of the forks 26. Yet another embodiment is for the lift sensor assembly 42 to be mounted internal one of the forks 26. The illustrated cable 46 runs along the sidewall of the fork 26 to the lift status display 44. A cable cover 48 is positioned along the inside wall of the fork 26 to protect the cable 46. Alternatively, if the lift sensor assembly 42 is internally mounted in one of the forks 26, then the cable 46 would also be run internally.

Figure 2:
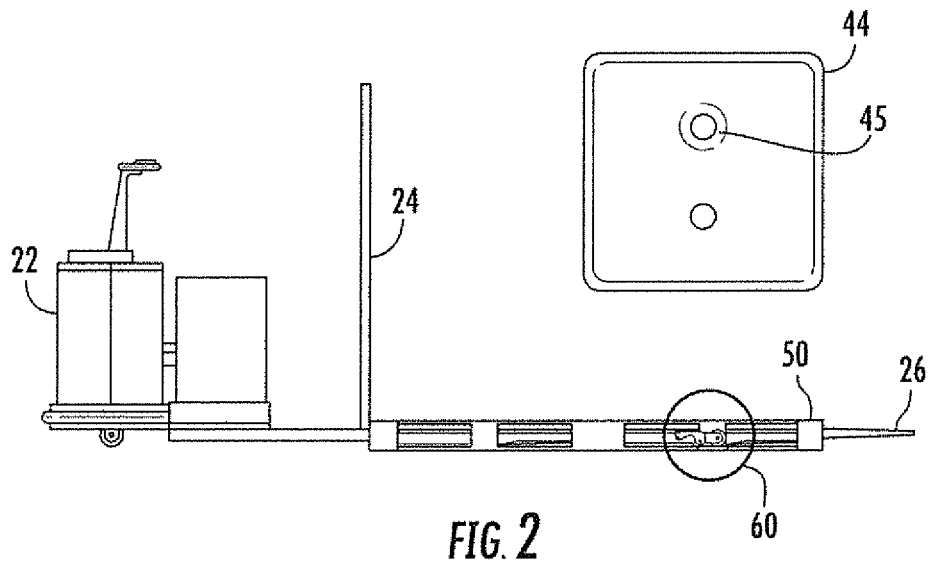
FIG. 2 is a side view of a pallet truck and a lift status display associated therewith indicating a no lift condition in accordance with the present invention.
Figure 3:
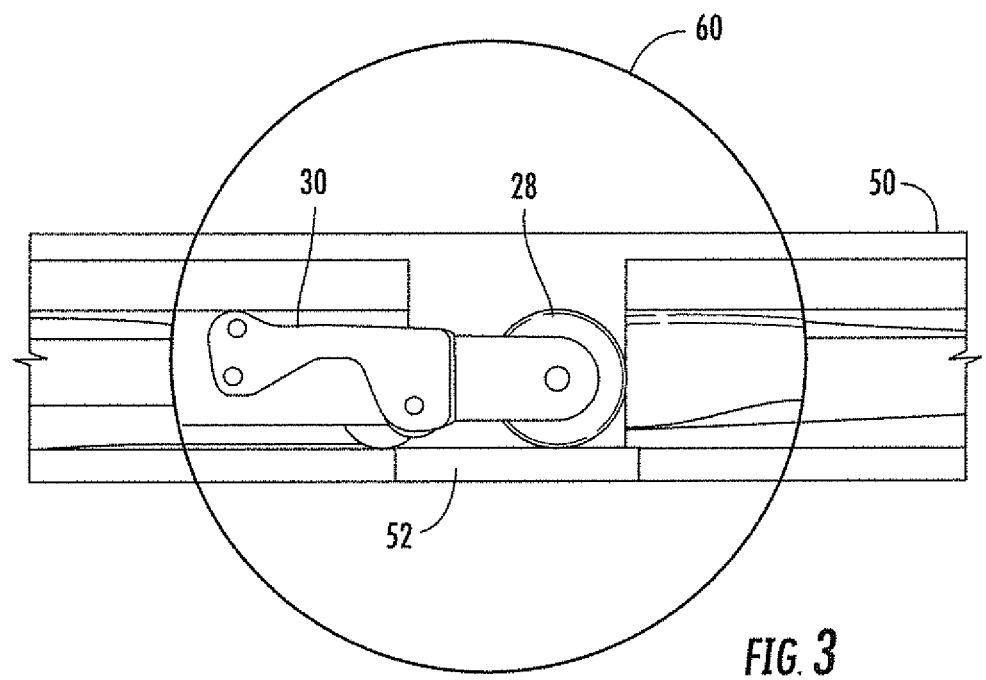
FIG. 3 is an enlarged partial exploded view of the load wheels of the forks resting on a bottom deck board of the pallet as shown in FIG. 2.

The lift indicator assembly 40 provides a reliable way to prevent the operator of the pallet truck 20 from lifting the forks 26 while the load wheels 28 are resting on a bottom deck board 52 of a pallet 50, as would be the case as shown in FIG. 2 and in the enlarged partial exploded view 60 in FIG. 3.

In this position, a red light 45 in the lift status display 44 is lit indicating that the load wheels 28 are resting on or near the bottom deck board 52. The operator of the pallet truck 20 has inserted the forks 26 to a position that is at risk for breaking the bottom deck board 52 because the load wheel 28 is situated near or on top of the bottom deck board 50. As a result, the load wheel linkages 30 and the load wheels 28 are to remain in a retracted position.

Figure 4:
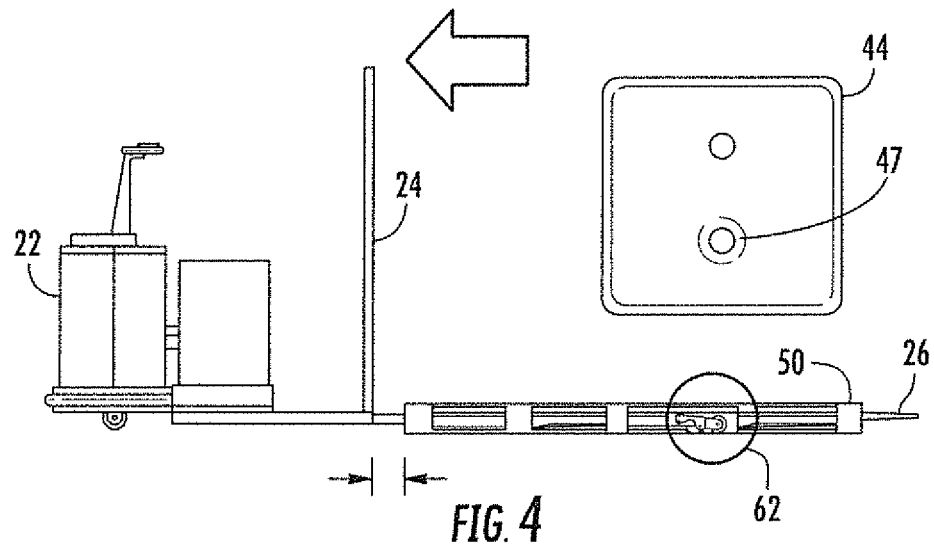
FIG. 4 is a side view of a pallet truck and a lift status display associated therewith indicating a lift condition in accordance with the present invention.
Figure 5:
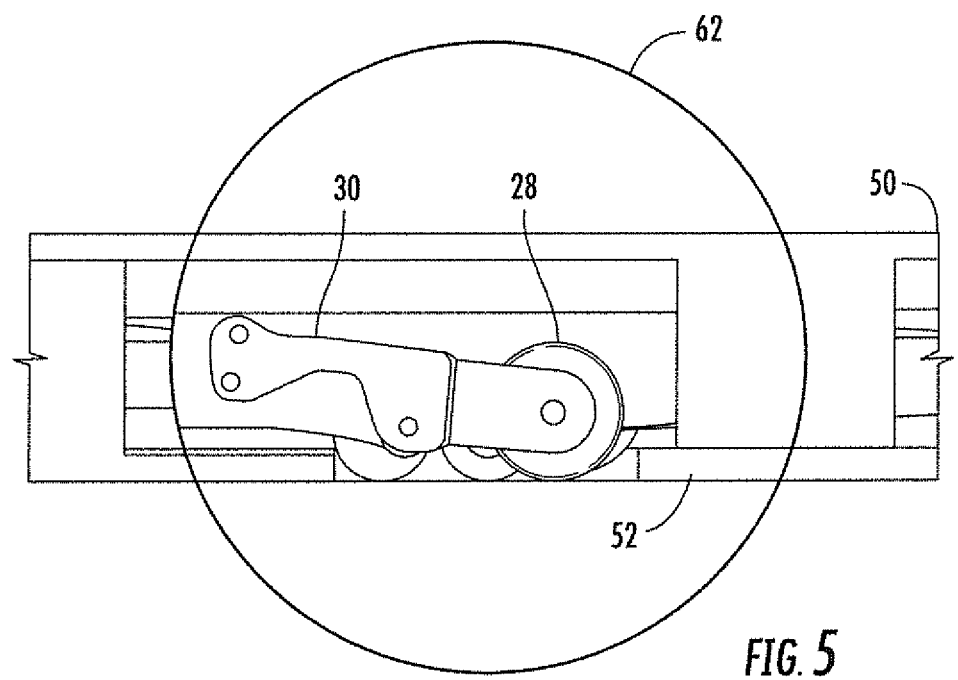
FIG. 5 is an enlarged partial exploded view of the load wheels of the forks not resting on a bottom deck board of the pallet as shown in FIG. 4.
Figure 6:
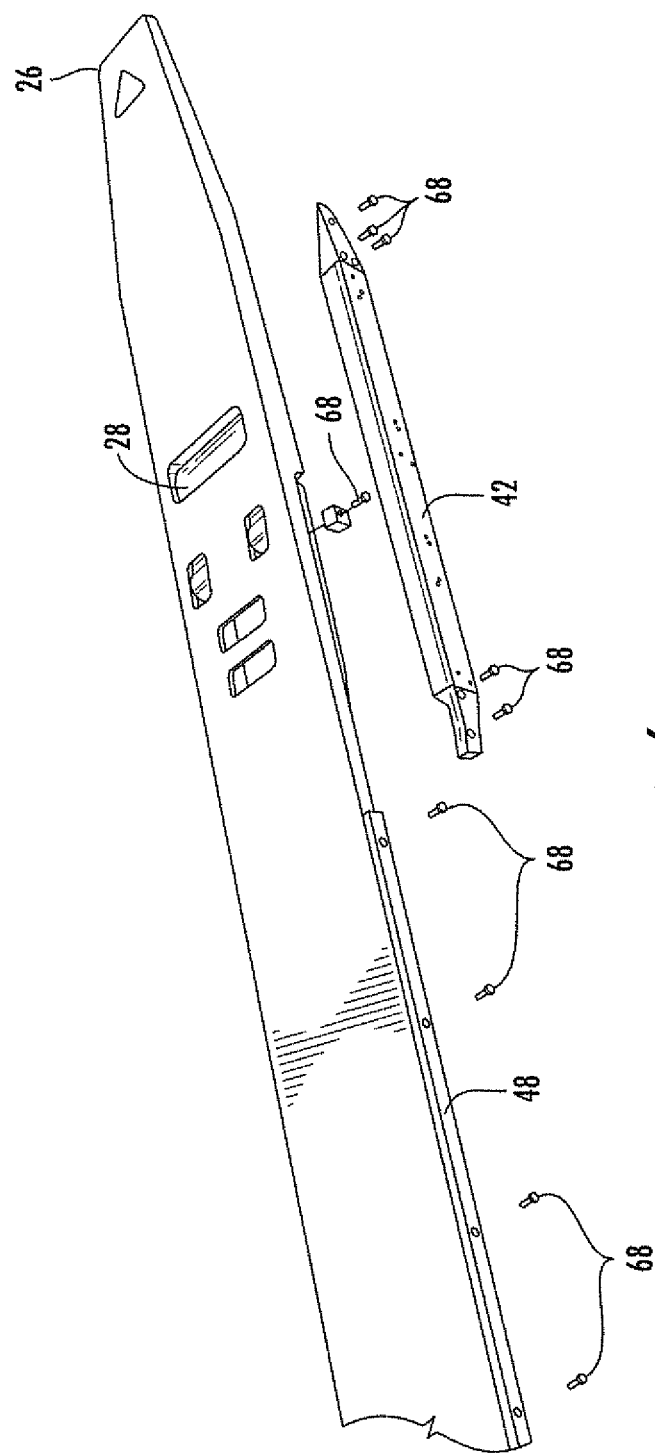
FIG. 6 is a side perspective view of the lift sensor assembly and cable cover illustrating their placement on a fork in accordance with the present invention.
Figure 7:
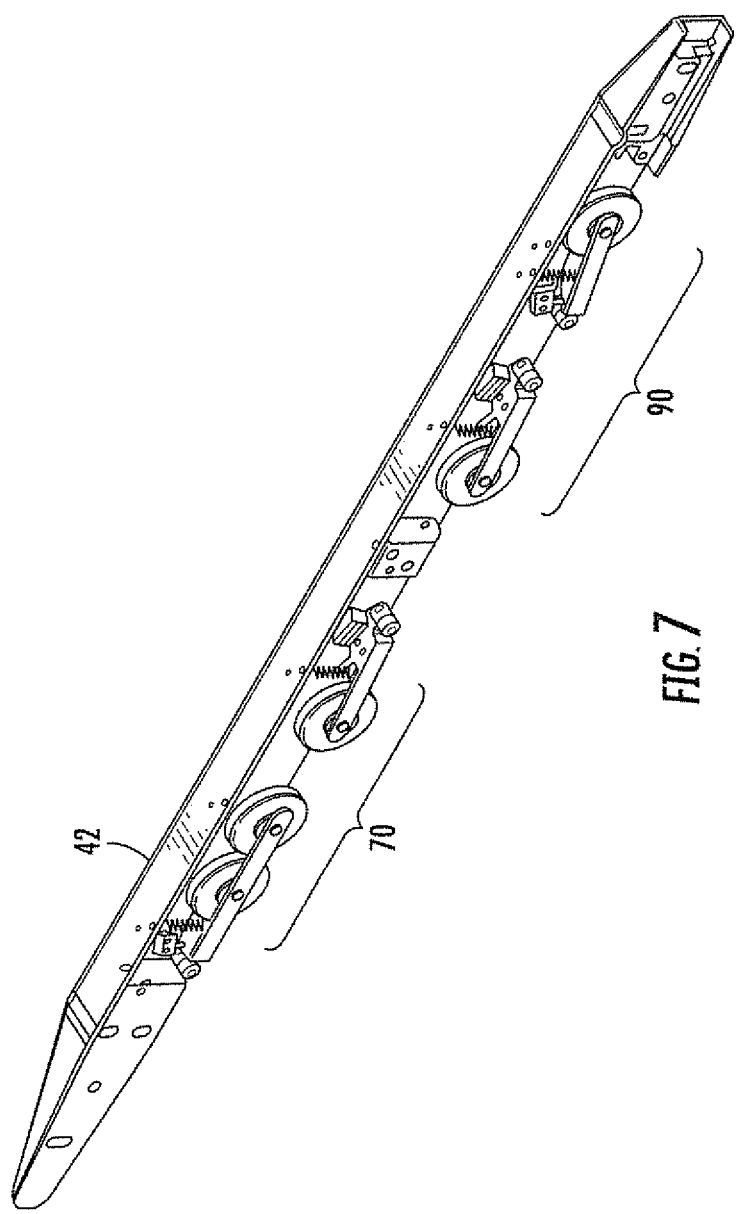
FIG. 7 is an interior side perspective view of the lift sensor assembly in accordance with the present invention.
Figure 8:
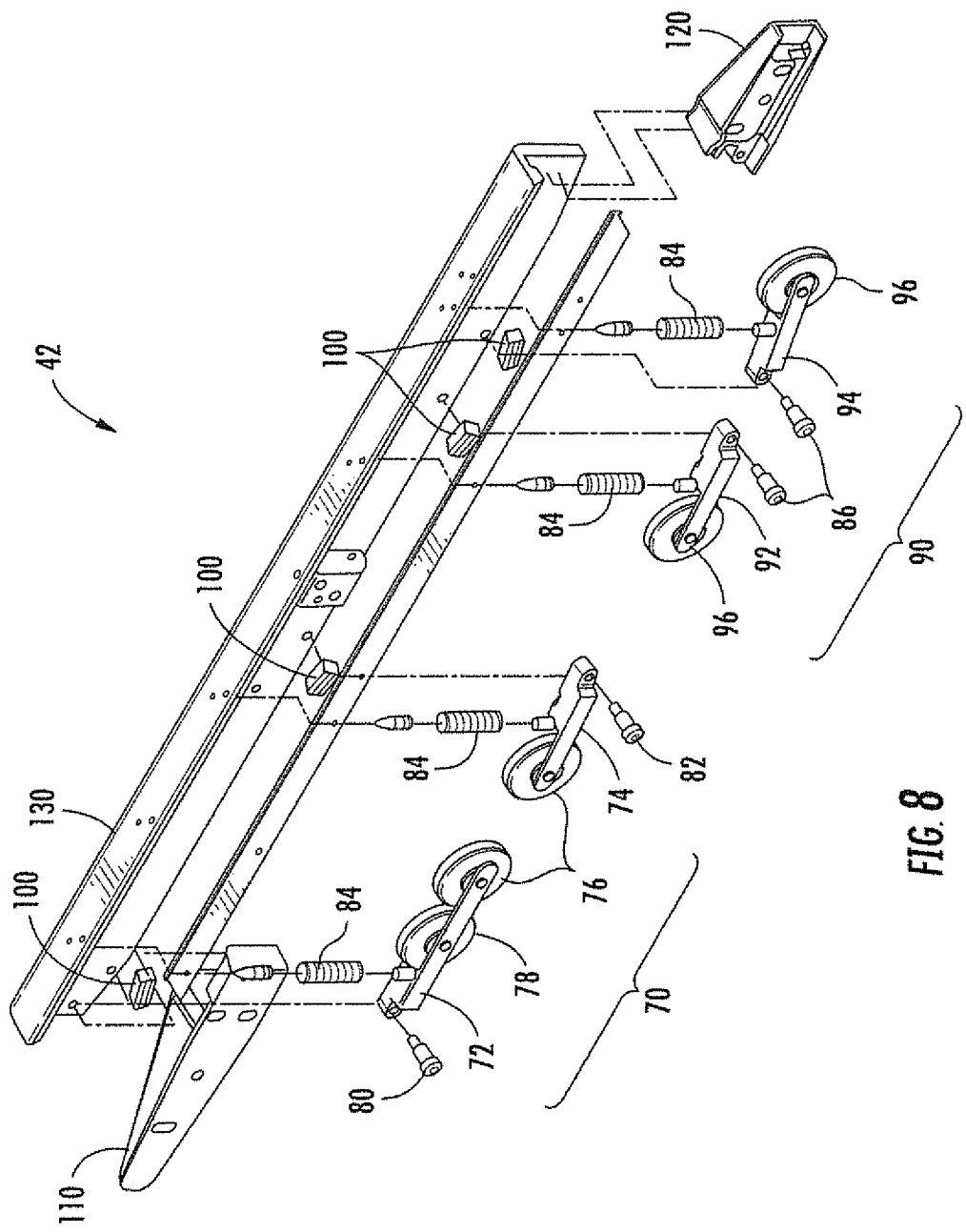
FIG. 8 is an exploded view of the lift sensor assembly shown in FIG. 7.

If the operator were to slightly back the pallet truck 20 out of the pallet 50 so that the load wheels 28 are no longer resting on the bottom deck board 52, as would be the case as shown in FIG. 4 and in the enlarged partial sectional view 62 in FIG. 5, then a green light 47 in the lift status display 44 is lit.

The lift status display 44 is not limited to a red no lift light 45 and a green lift light 47. Other techniques for communicating with the operator are readily acceptable, as appreciated by those skilled in the art. For example, a speaker may be used to communicate audible messages to the operator. This may be in addition to the lights 45, 47. Alternatively, the audible massage may be selectively used in place of the lights 45, 47. Even though the illustrated interface between the lift status display 44 and the lift sensor assembly 42 is a wired interface, the interface may alternatively be a wireless interface.

A wireless interface helps to simplify retrofit of a pallet truck 20 with a lift indicator assembly 40. In this embodiment, transmitters in the lift sensor assembly 42 communicate with a receiver in the lift status display 44, as readily appreciated by those skilled in the art.

Referring now to FIGS. 6-11, the lift sensor assembly 42 will be described in greater detail. Screws 68, for example, may be used to secure the lift sensor assembly 42 and the cable cover 48 to the fork 26. The illustrated lift sensor assembly 42 includes a primary sensor assembly 70 and an auxiliary sensor assembly 90. The lift sensor assembly 42 is positioned so that the primary sensor assembly 70 is adjacent and slightly ahead of the load wheel 28 in the fork 26.

Even though the primary sensor assembly 70 is essentially used to determine whether the load wheel 28 is resting on or to close to a bottom deck board 52, the auxiliary sensor assembly 90 permits the lift status display 44 to indicate a lift condition when the forks 26 are on the ground without engaging a pallet 50, as well as preventing false positives when engaging a pallet.

False positives may occur if the spacing of the bottom deck boards 52 in the pallet 50 is such that the primary and auxiliary sensor assemblies 70, 90 are simultaneously engaged with a bottom deck board, thereby indicating a lift condition even though the load wheel 28 may be on one of the bottom deck boards. The spacing of primary and auxiliary wheels 76, 96 within the primary and auxiliary sensor assemblies 70, 90 is selected with respect to the spacing of the bottom deck boards in the pallet to minimize the occurrence of false positives.

In addition, the spacing of primary and auxiliary wheels 76, 96 within the primary and auxiliary sensor assemblies 70, 90 may also help to minimize false negatives. False Negatives may occur due to uneven floors where the primary wheels 76 in the primary sensor assembly 70 are engaged while the auxiliary wheels 96 in the auxiliary sensor assembly 90 are not engaged.

The lift sensor assembly 42 includes a forward housing section 110, a rear housing section 120, and an intermediate housing section 130 positioned therebetween. The forward and rear housing sections 110, 120 are configured to lock in place the intermediate housing section 130. The forward and rear housing sections 110, 120 slideably engage the intermediate housing section 130 from opposite ends.

The primary sensor assembly 70 includes first and second primary arms 72, 74 each carrying a contact wheel 76. An arm may also be referred to as an actuator or linkage, for example. The contact wheels 76 may be optional. In lieu of a contact wheel, other types of contacting devices for contacting the ground as well contacting the bottom deck boards in the pallet may be used, such as a skid, for example. The first primary arm 72 is coupled to the intermediate housing section 130 in front of the load wheel 28, and the second primary arm 74 is coupled to the intermediate housing section behind the load wheel. The respective contact wheels 76 are facing towards each other based on how the first and second primary arms 72, 74 are coupled to the intermediate housing section 130.

The first and second primary arms 72, 74 may be pivotally coupled to the intermediate housing section 130, as illustrated. Alternatively, the first and second primary arms 72, 74 may be coupled to the intermediate housing section 130 so that they move in an up and down direction, or even in a slightly angled or non-vertical direction. As noted above, an arm may also be referred to as an actuator or a linkage.

Since the illustrated first primary arm 72 is the forwardmost arm to make contact with the pallet 50, it may also carry a guide wheel 78. The guide wheel 78 assists with insertion of the forks 26 into an opening in a pallet 50, as well as assisting with travel across the ground. As noted above, another type of contacting device may be used in lieu of a guide wheel 78, such as a skid, for example.

The auxiliary sensor assembly 90 also includes first and second auxiliary arms 92 and 94, each optionally carrying a contact wheel 96. The first and second auxiliary arms 92 and 94 are both on the same side of the load wheel 28. The first auxiliary arm 92 is coupled to the intermediate housing section 130 and the second auxiliary arm 94 is also coupled to the intermediate housing section. The respective contact wheels 96 are facing away from each other based on how the first and second auxiliary arms 92, 94 are coupled to the intermediate housing section 130.

The first and second auxiliary arms 92, 94 may also be pivotally coupled to the intermediate housing section 130, as illustrated. Alternatively, the first and second auxiliary arms 92, 74 may be coupled to the intermediate housing section 130 so that they move in an up and down direction, or even in a slightly angled or non-vertical direction. The first and second auxiliary arms 92, 94 may be pivotally coupled while the first and second primary arms 72, 74 are non-pivotally coupled to the intermediate housing section 130, or vice-versa.

Each primary and auxiliary arm 72, 74, 92, 94 has a contact switch 100 associated therewith. When the contact wheels 76, 96 are all resting on the ground, then the respective switches 100 are engaged in a closed position. Normally, a closed position by the switches 100 associated with the primary sensor assembly 70 indicates that the load wheels 28 are resting on a bottom deck board 52. However, in this particular condition, when the forks 26 are not engaging a pallet 50, then it is obviously ok to lift the forks if necessary prior to moving the pallet truck 20.

Consequently, when the switches 100 associated with the contact wheels 96 of the auxiliary sensor assembly 90 are also in the engaged or closed position along with the switches 100 associated with the contact wheels 76 of the primary sensor assembly 70, then the lift status display 44 interprets this condition as lift condition and activates the green light 47. In addition to helping to prevent false positives, this is another advantage of the auxiliary sensor assembly 90 working in cooperation with the primary sensor assembly 70.

As the forks 26 are inserted into an opening in a pallet 50, the primary sensor assembly 70 passes over a first bottom deck board 52. Due to the wedge shaped design of the forks 26, the tips of the forks extend in height above the thickness of the bottom deck boards. A thickness of the bottom deck board is about 0.75 inches, whereas a height of the tips of the forks 26 is about 1.25 inches. This provides a clearance gap of about 0.5 inches.

The resulting clearance gap causes the switches 100 associated with the primary sensor assembly 70 to become disengaged or open when the base 27 or lowermost surface of the forks 26 is resting on the upper surface of the bottom deck board 52. In other words, the first and second primary arms 72, 74 are allowed to move downwards within the clearance gap. This distance is enough for the first and second primary arms 72, 74 to become disengaged with the switches 100. Typically, movement of the first and second primary arms 72, 74 is within range of about 0.015 to 0.030 inches, for example, to become engaged or disengaged with the switches 100. This lift scenario is best illustrated in FIG. 9, and the green light 47 in the lift status display 44 is activated.

However, if the operator were to continue inserting the forks 26 into the opening in the pallet 50 until the guide wheel 78 carried by the first primary arm 72 in the primary sensor assembly 70 contacts the next bottom deck board 52, then the switch 100 associated therewith is engaged indicating that the load wheel 28 is resting on bottom deck board, or that the load wheel is too close to the bottom deck board. This means that the load wheel linkages 30 connected to the load wheel 28 would contact the bottom deck board when the forks 26 are lifted. This no lift scenario is best illustrated in FIG. 10, with a close-up view provided in FIG. 11. As a result, the red light 45 in the lift status display 44 is activated.

Size and spacing of the guide wheel 78 and the contact wheels 76, 96 are important. The guide wheel 78 and the contact wheels 76, 96 are about 2.25 inches in diameter, whereas the load wheel 28 is about 3.5 inches in diameter. In other embodiments, the diameter of the guide wheel 78 may be less than the diameter of the contact wheels 76, 96. The guide wheel 78 is positioned partially ahead of the load wheel 28. The contact wheel 76 carried by the first primary arm 72 is somewhat aligned with a rear of the load wheel 28. The spacing between the contact wheels 76 in the primary sensor assembly 70 is within a range of about 1-2 inches. This helps to prevent the scenario in which both contact wheels 76 in the primary sensor assembly 70 are resting on a bottom deck board, thus providing a false positive on the lift status display 44 when the contact wheels 96 in the auxiliary sensor assembly 90 are also contacting the ground or a bottom deck board.

Similarly, the contact wheel 96 carried by the first primary arm 92 in the auxiliary sensor assembly 90 is within a range of about 5-8 inches from the contact wheel 76 carried by the second primary arm 74 in the primary sensor assembly 90. The spacing between the contact wheels 96 in the auxiliary sensor assembly 90 is within a range of about 5-8 inches. The contact wheels 96 in the auxiliary sensor assembly 90 advantageously help to prevent false positives which could occur based on the spacing of the bottom deck boards 52 in the pallet 50. The various spacings will vary depending on the actual sizes of the intended pallets to be moved, as readily appreciated by those skilled in the art.

The guide wheel 78 and the contact wheels 76, 96 are preferably made out of rubber. This advantageously allows the flexibility of the guide wheel 78 and the contact wheels 76, 96 to deflect transverse loads when operating on an uneven or rough floor.

Referring back to FIG. 8, the first primary arm 72 moves about a shaft 80 that is also used to secure the arm to the intermediate housing section 130. Similarly, the second primary arm 74 moves about a shaft 82 that is also used to secure the arm to the intermediate housing section 130. Shafts 86 are used to secure the first and second auxiliary arms 92, 94 in the auxiliary sensor assembly 90.

Each primary arm 72, 74 in the primary sensor assembly 70 has a biasing device associated therewith for biasing the primary arms away from their respective switches 100. The biasing device may be a spring 84, for example. The springs 84 are in a normally compressed state so that they normally push outwards on the first and second primary arms 72, 74. Similarly, each auxiliary arm 92, 94 in the auxiliary sensor assembly 90 has a biasing device, such as a spring 84, associated therewith. The springs 84 are also in a normally compressed state so that they normally push outwards on the first and second auxiliary arms 92, 94.

Each primary and auxiliary arm 72, 74, 92, 94 has a hard stop associated therewith. This prevents the arms 72, 74, 92, 94 from dropping too far and hyper-extending, as well as from being compressed too much as would be the case when the forks 26 of the pallet truck 20 quickly enter the opening in the pallet 50. The later case also helps to prevent the switches 100 from being crushed.

Each switch 100 typically has two wires extending therefrom. Since there are four switches 100, then the cable 46 includes at least 8 wires extending to the lift status display 44. The wires may be configured as a ribbon cable. The lift status display 44 includes a logic controller 43 to interpret the open/closed states of each switch 100 in order to activate the appropriate red light 45 or the green light 47.

Figure 12:
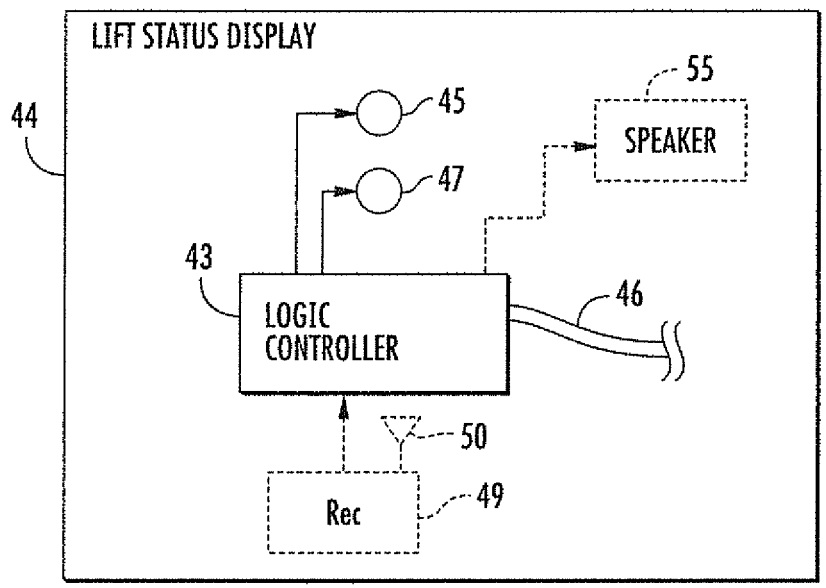
FIG. 12 is a block diagram of the lift status display in accordance with the present invention.

Referring now to FIG. 12, the logic controller 43 within the lift status display 44 interfaces with individual wires in the cable 46 to determine a lift condition of the load wheel 28 based on whether the respective contact switches 100 are in an engaged position or in a disengaged position. The logic controller 43 activates the red light 45 or the green light 47 accordingly. Separately or in addition to, the logic controller 43 may also generate audio commands or signals to be communicated via a speaker 55.

Figure 11:
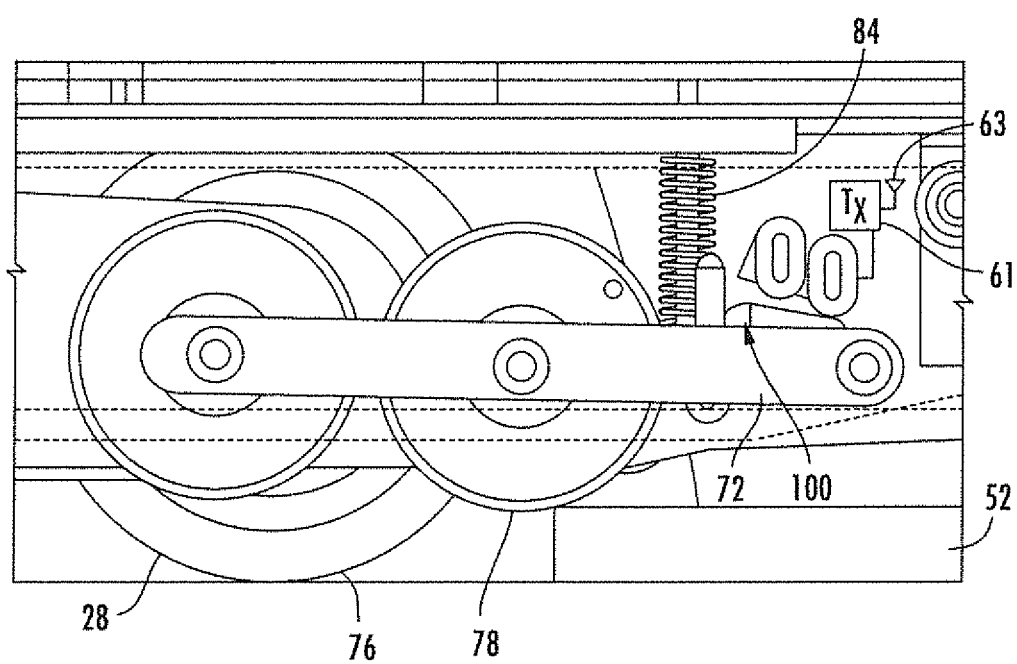
FIG. 11 is an enlarged cut-away side view of a contact switch being closed by the first arm of the primary lift sensor in accordance with the present invention.

As mentioned above, the interface between the lift status display 44 and the lift sensor assembly 42 may be a wireless interface. In lieu of the cable 46, a receiver 49 with an antenna associated 51 therewith would receive coded signals from the respective contact switches 100. As illustrated in FIG. 11, a transmitter 61 and a corresponding antenna 63 are associated with a contact switch 100 positioned adjacent the first primary arm 72. In the wireless interface configuration, each contact switch 100 would have its own transmitter 61 associated therewith providing a unique coded signal when in the engaged position.

Figure 13:
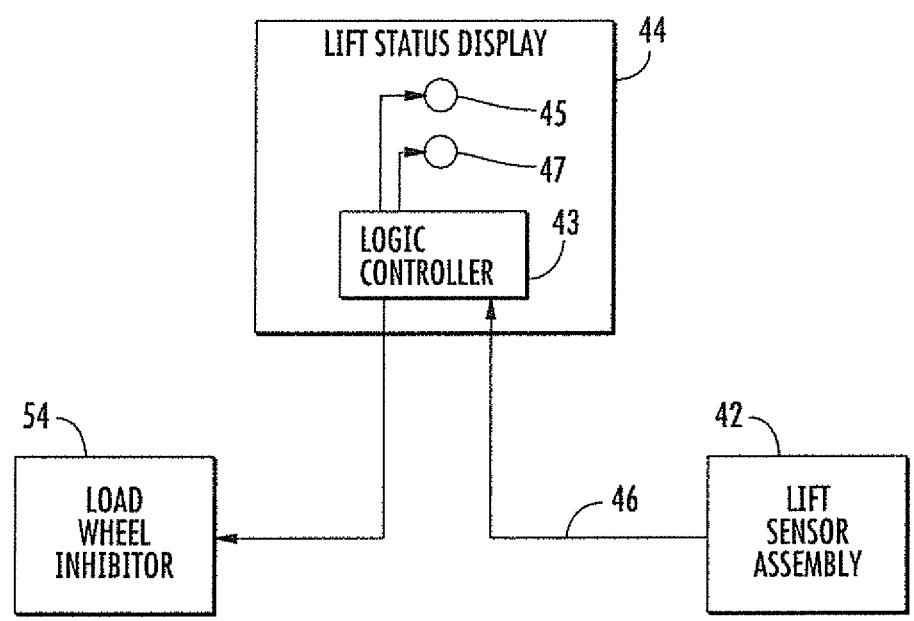
FIG. 13 is a block diagram of the lift indicator assembly that further includes a load wheel inhibitor in accordance with the present invention.

Referring now to FIG. 13, the lift indicator assembly 40 may further include a load wheel inhibitor 54 to prevent the load wheels 28 from lifting the forks 26 if the logic controller 43 determines that there is a no lift condition. The load wheel inhibitor 54 advantageously prevents an operator of the pallet truck 20 from ignoring or overlooking display of the red light 47 on the lift status display 44.

When the red light 47 is activated by the logic controller 43, an inhibit signal is sent from the logic controller to the load wheel inhibitor 54. The load wheel inhibitor 54 may be implemented in a number of different embodiments, as readily appreciated by those skilled in the art. For example, the load wheel inhibitor 54 may be configured to inhibit control of the hydraulic pump used to operate the ties rods that extend through the forks 26 to the load wheel linkages 30. The load wheel inhibitor 54 thus overrides operator input to lift the forks 26 if an inhibit signal is generated by the logic controller 44.

Figure 14:
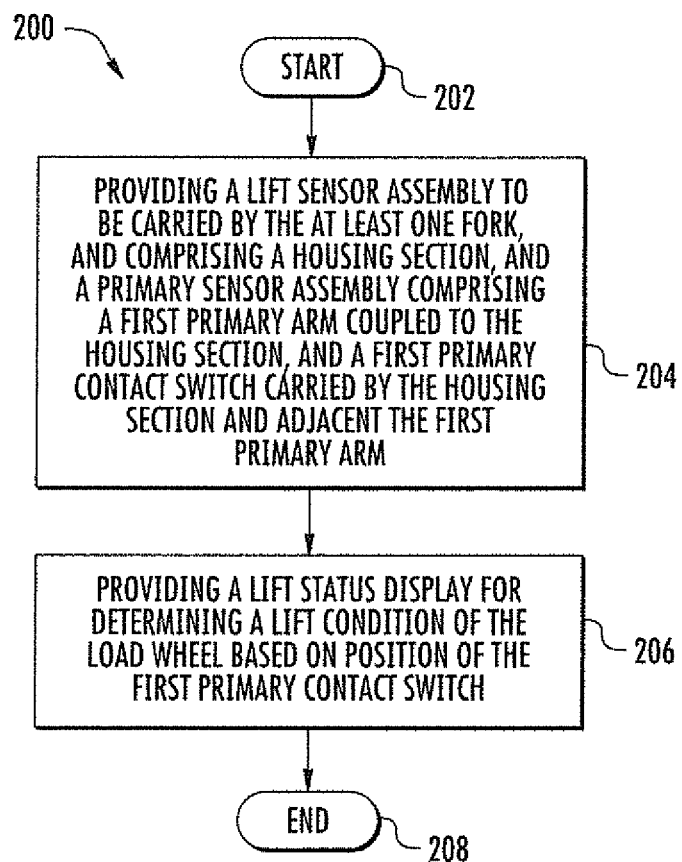
FIG. 14 is a flowchart illustrating a method for providing a lift indicator assembly for a pallet truck in accordance with the present invention.

Another aspect is directed to a method for providing a lift indicator assembly 40 for a pallet truck 20 as described above. Referring now to the flowchart 200 illustrated in FIG. 14, from the start (Block 202), the method comprises providing a lift sensor assembly 42 at Block 204 to be carried by a fork 26.

The lift sensor assembly 42 comprises a housing section 130 and a primary sensor assembly 70. The primary sensor assembly 70 includes a first primary arm 72 coupled to the housing section 130, and a first primary contact switch 100 carried by the housing section 130 and adjacent the first primary arm.

The method further comprises at Block 206 providing a lift status display 44 for determining a lift condition of the load wheel 28 based on position of the first primary contact switch 100. The method ends at Block 208.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included.

That which is claimed is:

1. A lift indicator assembly for a pallet truck comprising at least one fork extending in a substantially horizontal direction for insertion into an opening in a pallet, and a load wheel coupled to the at least one fork and configured for lifting the at least one fork, the lift indicator assembly comprising:
    a lift sensor assembly to be carried by the at least one fork and comprising
        a housing section, and
        a primary sensor assembly comprising
            a first primary arm coupled to said housing section, and
            a first primary contact switch carried by said housing section and adjacent said first primary arm, said first primary contact switch having an engaged position and a disengaged position based on position of said first primary arm; and
    a lift status display configured for determining a lift condition of the load wheel based on position of said first primary contact switch.

2. The lift indicator assembly according to claim 1 wherein said primary sensor assembly further comprises:
    a second primary arm coupled to said housing section; and
    a second primary contact switch carried by said housing section and adjacent said second primary arm, said second primary contact switch having an engaged position and a disengaged position based on position of said second primary arm;
    wherein said lift status display is further configured for determining the lift condition of the load wheel based on position of said second primary contact switch in combination with the position of said first primary contact switch.

3. The lift indicator assembly according to claim 1 wherein said first primary arm is coupled to said housing section to be in front of the load wheel, and wherein said second primary arm is coupled to said housing section to be behind the load wheel.

4. The lift indicator assembly according to claim 1 wherein said lift sensor assembly further comprises an auxiliary sensor assembly comprising:
    at least one auxiliary arm coupled to said housing section; and
    at least one auxiliary contact switch carried by said housing section and having an engaged position and a disengaged position based on position of said at least one auxiliary arm;
    wherein said lift status display is further configured for determining the lift condition of the load wheel based on position of said at least one auxiliary contact switch in combination with the position of said first primary contact switch.

5. The lift indicator assembly according to claim 1 wherein said lift status display comprises at least one light for visually displaying the lift condition of the load wheel.

6. The lift indicator assembly according to claim 5 wherein said lift status display comprises a controller for activating said at least one light based on the position of said first primary contact switch.

7. A method for providing a lift indicator assembly for a pallet truck comprising at least one fork extending in a substantially horizontal direction for insertion into an opening in a pallet, and a load wheel coupled to the at least one fork and configured for lifting the at least one fork, the method comprising:
    providing a lift sensor assembly to be carried by the at least one fork, and comprising
        a housing section, and
        a primary sensor assembly comprising
            a first primary arm coupled to the housing section, and
            first primary contact switch carried by the housing section and adjacent the first primary arm, the first primary contact switch having an engaged position and a disengaged position based on position of the first primary arm; and
    providing a lift status display for determining a lift condition of the load wheel based on position of the first primary contact switch.

8. The method according to claim 7 wherein the first primary arm is coupled to the housing section in front of the load wheel, and wherein the second primary arm is coupled to the housing section behind the load wheel.

9. The method according to claim 7 wherein the lift status display comprises at least one light for visually displaying the lift condition of the load wheel.

\* \* \* \* \*